United States Patent [19]
Headley et al.

[11] Patent Number: 4,748,961
[45] Date of Patent: Jun. 7, 1988

[54] INTERNAL COMBUSTION ENGINES

[76] Inventors: Ronald G. A. Headley, 65 Worcester Road, West Hagley, Stourbridge, West Midlands; John Wilkes, 87A Park Lane East; Stephen J. Wilkes, 11 Albert Street, both of Tipton, West Midlands, all of England

[21] Appl. No.: 902,398
[22] PCT Filed: Jan. 6, 1986
[86] PCT No.: PCT/GB86/00008
  § 371 Date: Aug. 14, 1986
  § 102(e) Date: Aug. 14, 1986
[87] PCT Pub. No.: WO86/04116
  PCT Pub. Date: Jul. 17, 1986

[30] Foreign Application Priority Data
Jan. 12, 1985 [GB] United Kingdom ............ 8500884

[51] Int. Cl.⁴ ............................................... F02G 5/00
[52] U.S. Cl. ................................. 123/557; 123/525; 123/575
[58] Field of Search ......................... 123/557, 525

[56] References Cited
U.S. PATENT DOCUMENTS
3,851,633 12/1974 Shih ............................. 123/127
4,213,433 7/1980 Day .............................. 123/549
4,259,937 4/1981 Elliott .......................... 123/557
4,345,141 8/1982 Little ........................... 123/557

FOREIGN PATENT DOCUMENTS
2826976 1/1980 Fed. Rep. of Germany .
3407629 2/1984 Fed. Rep. of Germany .
 576434 8/1924 France .
 265186 4/1928 United Kingdom .
2065763 8/1937 United Kingdom .
1513051 2/1975 United Kingdom .
2037894 12/1979 United Kingdom .
2078297 3/1981 United Kingdom .
 469826 7/1981 United Kingdom .
2144799 8/1983 United Kingdom .

Primary Examiner—E. Rollins Cross
Attorney, Agent, or Firm—Jeffers, Hoffman & Niewyk

[57] ABSTRACT

A mineral oil (as defined) is vaporized in an electrically heated heat exchanger, the vaporized oil being added to each combustible charge supplied to the cylinders of a multi-cylinder internal combustion engine. The heat exchanger can be (a) a helically wound tube whose convolutions extend around the whole or a part of the length of at least one electrical heating element, or (b) at least one helically wound electrical heating element whose convolutions extend around the whole or a part of the length of a straight tube. The oil enters the tube either under the influence of gravity or from the output side of a pump. The arrangement includes a thermostat for temperature control and a cut-out for battery disconnection when the oil level reaches a predetermined minimum. The wiring is such that the engine must be running for the heating element(s) to be heated.

9 Claims, 4 Drawing Sheets

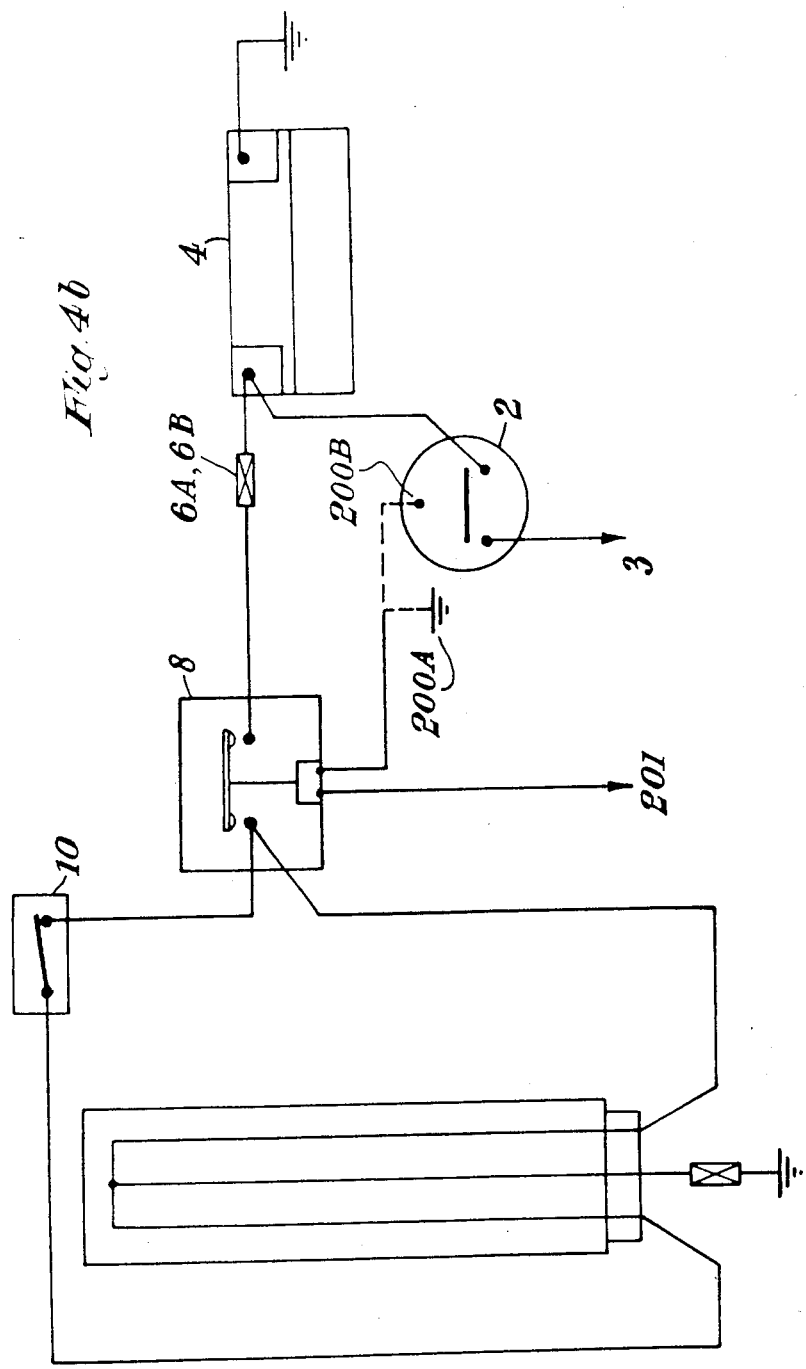

INTERNAL COMBUSTION ENGINES

BACKGROUND OF THE INVENTION

1. Field of the Invention

This invention relates to internal combustion engines.

2. Description of the Prior Art

The object of the present invention is to improve upon the engines disclosed in United Kingdom Patent Specifications No. 1,513,051 and No. 2,078,297B because, although the general principle underlying both of the inventions disclosed therein has proved to be perfectly sound, a shortcoming of both of the engines disclosed in said Specifications is the time taken to modify an existing engine in order to utilize the respective inventions. Typically, the time taken to complete an installation has been found to be somewhere between 5 and 7 hours and (because time is chargeable in addition to parts and materials) the cost has been higher than is desirable.

The term "mineral oil" as employed herein is intended to include a paraffin hydrocarbon of high molecular weight (high boiling range) which preferably contains a high proportion of branched-chain isomers. Any commercially available material containing such compounds, but devoid of oxygen-containing compounds, should be found to be suitable feedstock.

SUMMARY OF THE INVENTION

The present invention consists in a multi-cylinder internal combustion engine which comprises first means for conducting a combustible fuel and air to each cylinder of the engine and second means including a heat exchanger in which at least a part of a quantity of a mineral oil (as defined above) is converted by electrically generated heat from its liquid condition to a vapour which is added to the combustible charge which is supplied to each cylinder, whereby the efficiency of the engine is improved.

In a preferred embodiment of the engine described in the preceding paragraph, said vapour may be conveyed to an intermediate element, which forms part of the engine, in order to be added to said combustible charge. In the case where the engine is a spark-ignition engine, the intermediate element is a carburettor whereas, in the case where the engine is a compression-ignition engine, the intermediate element is an air-intake device.

In an engine as described in either of the two preceding paragraphs, said heat exchanger preferably comprises at least one electrical heating element which, when energised, generates heat which is absorbed by an elongate hollow member into one end of which said liquid mineral oil flows. Said elongate hollow member preferably is a tube; said tube may be wound in a helix and, in such a case, it is preferred that the or each electrical heating element be positioned within the convolutions, or within at least some of the convolutions, of the helically wound tube. Alternatively, said tube may be straight and, in such a case, it is preferred that the or each electrical heating element be wound in a helix about the whole length of said tube or about a part of the length of said tube.

The elongate hollow member referred to in the preceding paragraph is preferably made of brass.

In an engine as described in any one of the four preceding paragraphs, said liquid mineral oil is stored in a tank. Preferably, said oil is stored in the lower part of the tank of which the upper part acts, in use, as a trap in which any part of said quantity of the mineral oil which has not become vaporized is returned to the remaining liquid mineral oil.

In one embodiment of the engine described in any one of the five preceding paragraphs, the tank is so connected to the heat exchanger that the liquid mineral oil flows from the tank into the heat exchanger under the influence of gravity. In an alternative embodiment of the engine described in any one of the five preceding paragraphs, the liquid mineral oil is drawn from the tank by a pump which pumps said oil to the heat exchanger.

In an engine as described above and according to the present invention, there may be two electrical heating elements, a thermostat being provided which operates at a predetermined temperature of the heated mineral oil to interrupt the supply of electrical current to one of said heating elements.

Preferably, said engine according to the present invention includes a safety switch means which interrupts the supply of electrical current to the heat exchanger as soon as the amount of said liquid mineral oil available for vaporization in said heat exchanger reaches a predetermined value (level).

In an engine as described in any one of the eight preceding paragraphs, the engine is preferably associated with a battery and a battery-charging system, the heat exchanger including switch means wired across said battery-charging system, whereby the heat exchanger is only permitted to function when the engine is running.

A multi-cylinder internal combustion engine according to the present invention may also include other features hereinafter described and/or claimed in respective ones of the Claims which are appended to one or more other Claims.

BRIEF DESCRIPTION OF THE DRAWINGS

FIG. 3 is a diagrammatic drawing which illustrates another embodiment of said equipment; and FIGS. 4a, 4b illustrate the electrical circuitry associated with said equipment, engine and motor car.

DESCRIPTION OF THE PREFERRED EMBODIMENT

Figure 1:
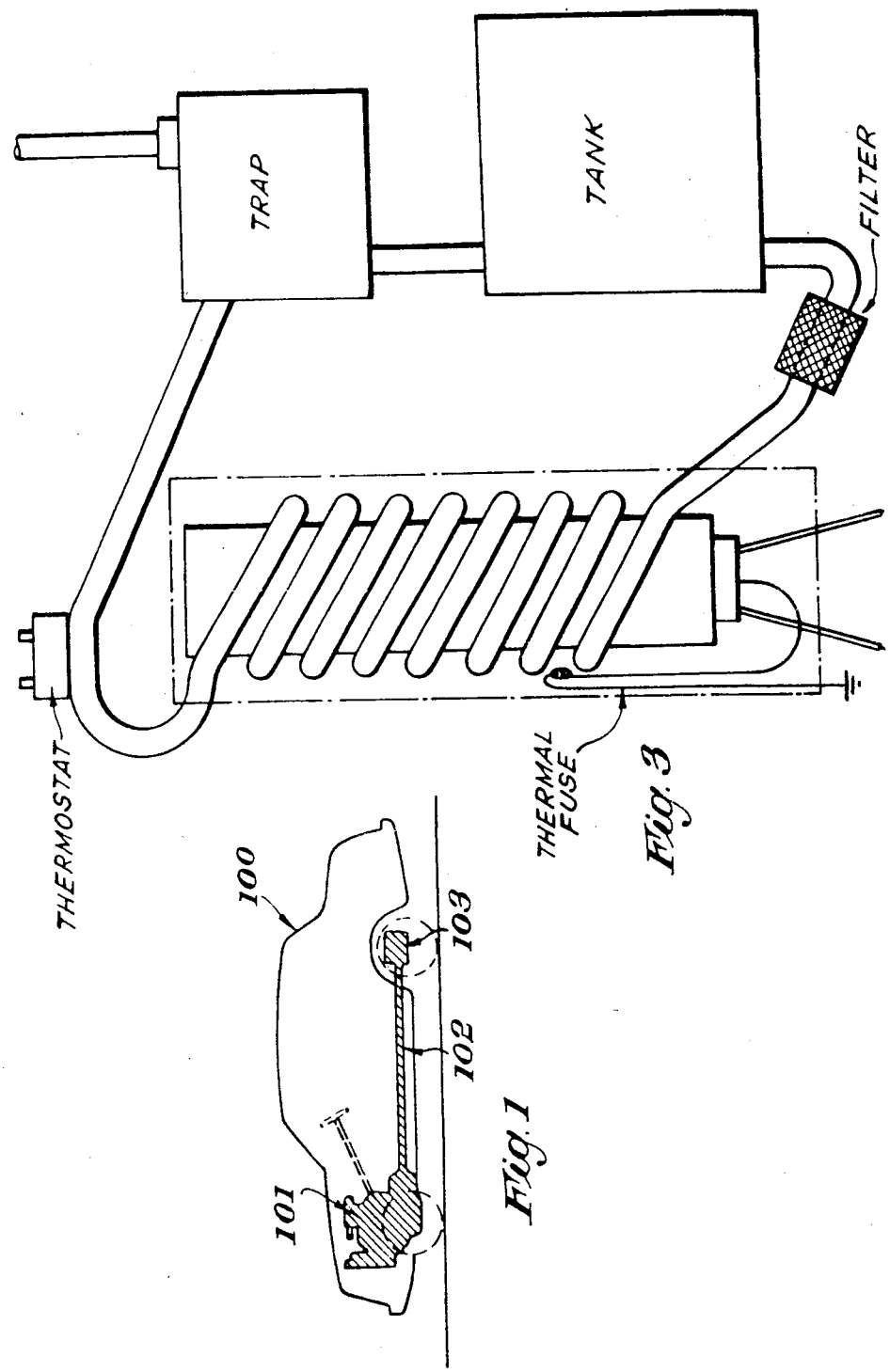
FIG. 1 is a schematic drawing of a typical motor car which has an internal combustion engine to propel it forwards or backwards.

FIG. 1 illustrates, by way of example only, a motor car 100 having a four-cylinder internal combustion engine 101 which is mounted at the front of the car and which is connected by a propeller shaft 102 to final-drive gears, indicated by 103, which transmit the drive to the rear wheels of the car. Although not individually illustrated, it is to be understood that the engine 101 includes a clutch and gearbox and is fed with a fuel stored in an appropriately situated fuel tank. The fuel is burnt after being mixed with air and the heat produced is converted into mechanical power. In the case of a spark-ignition engine, petrol is vaporised, mixed with air and ignited by a spark which is produced electrically whereas, in so-called Diesel engine, air is compressed in the cylinders of the engine in order to heat said air and then finely atomised fuel oil is injected into the heated air which causes the fuel oil to ignite, to liberate heat and thereby to produce the power stroke. The various items of equipment necessary to carry out these steps in both kinds of engine are so well-known (e.g. from "Fundamentals of motor vehicle technology" by V. A. W. Hillier and F. W. Pittuck, published 1966 and subsequently published in at least one revised edition) that it is considered to be absolutely unnecessary to illustrate them or to describe them in any further detail.

Figure 2:
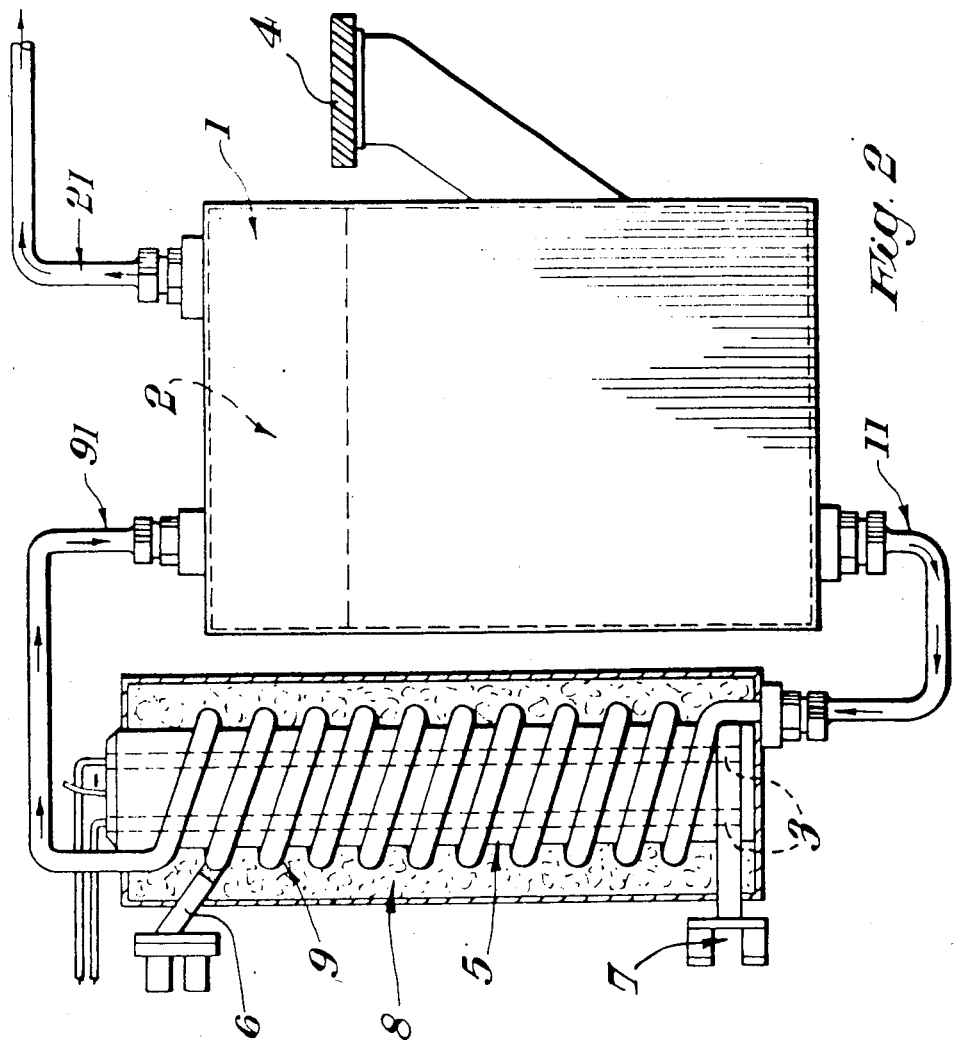
FIG. 2 is a diagrammatic drawing which illustrates one embodiment of the equipment which must be connected to said engine in order to carry the present invention into effect.

Referring now to FIG. 2, there is illustrated a tank 1 for the storage of, for example, one liter of a mineral oil (as defined above); said tank includes a trap section 2 and is placed in any convenient location on the vehicle and is connected by suitable pipework 11 to the lower end of a heat exchanger which comprises two separate electrical heating elements 3 around which extend the convolutions of a helically wound brass tube 9. The upper end of the heat exchanger is connected to the trap 2 by way of pipework 91 and said trap is connected to the cylinders (not illustrated) of the engine 101 by way of pipework 21 whose other end is connected to an intermediate element which may be, for example, a carburettor in a spark-ignition internal combustion engine. If the engine is of said spark-ignition type, said other end of the pipework 21 could be connected to the air intake of said carburettor by way of the usual air filter (not illustrated). Alternatively, if the engine is of the compression-ignition type, the intermediate element may be an air intake device (for example, the inlet manifold of the engine).

The tank 1 is provided with a convenient filler 4 whose openable end determines the maximum level of mineral oil and which, as a consequence, ensures that there is always a space above the liquid mineral oil, said space acting as the trap 2.

The equipment described above with reference to FIG. 2 is provided with a thermostat 6 and a cutout 7. The function of the thermostat 6 is to disconnect one of the two heating elements 3 when the temperature at which the mineral oil vaporises is reached. The function of the cut-out 7 is to disconnect both of heating elements 3 in the event of the mineral oil falling to a very low level in the tank 1 and/or in the event of the termostat 6 failing to operate properly.

The heating elements 3 and the convolutions of the coiled tube 9 are provided with some suitable cover or jacket 8 made of a heat-retaining material, and the two heating elements 3 may be housed within a protective heat-conducting cover 5.

In operation, the liquid mineral oil (for example, that which is colloquially called paraffin by the purchasing public) moves under the influence of gravity along the pipework 11 to the coiled tube 9 in which said mineral oil is heated by the heat emitted by the heating elements 3 and becomes at least partially vaporised. The vaporised paraffin (and any paraffin which may still be in liquid form) passes along the pipework 91 and is fed into the trap 2 in which any paraffin in liquid form drops into the remainder of the liquid in the tank 1 whereas the vaporised paraffin passes out of the trap 2 and through the pipework 21 to the intermediate element to be mixed (a) with the combustible mixture of vaporised petrol and air in the case of a spark-ignition engine, or (b) with air in the case of a compression-ignition engine.

It has been found, from extensive road tests which have been made with vehicles whose engines utilize the present invention, that the exhaust gases emitted from the exhaust pipe of the vehicle into the atmosphere are very clean and certainly well below pollution-producing levels. It is thought (without there being any warranty that the opinion is correct) that the improved thermal efficiency of the engine can be attributed to the metered induction of the vaporised paraffin. Moreover, it is estimated that one liter of paraffin is sufficient for over 4000 miles (more than 6500 kilometers) of motoring.

The use of electrical heating in place of the heating inside the exhaust manifold of an engine has meant, in practice, that the heating of the liquid mineral oil can be very precisely controlled. Whilst the use of two heating elements 3 is preferred because vaporising temperature is reached in about 4½ minutes, only one heating element 3 can be used and the vaporising temperature will be reached in about 15 minutes. Moreover, the "cracking" of the liquid mineral oil at high temperatures and at extremely high engine speeds (as discussed in Specification No. 2,078,297B) has been avoided by the accurate control of the heating.

Referring to the actual composition of the brass, although it is possible (or even probable) that other specifications would give satisfactory performances, I have used brass according to the following specification:

| | |
|---|---|
| Copper | 69% to 71% |
| Lead | 0.07% |
| Iron | 0.06% |
| Arsenic | 0.02% to 0.06% |
| Zinc | Remainder |

The specification given above is in accordance with British Standard 2871 (CZ 126).

It has been found that satisfactory results are obtained with the following:

Brass tube.

4.75 mm to 5 mm outside diameter and 1.625 mm wall thickness. The length of the brass tube before coiling is about 150 cms.

Heating elements.

Each heating element has a rating of 95 Watts.

Thermostat.

This is set to operate at 95° C. In the bench tests which have been carried out, it was found that a thermostat mounted on the pipework 91 and set to operate at 95° C. cut out as soon as the system started to produce mineral oil vapour(s). It seemed sensible, therefore, to ensure that one of the heating elements 3 was disconnected at that temperature. The temperature thereafter rose, using the one remaining heat element, to a maximum of about 160° C. Tests were made in order to find out what would happen if the two heating elements 3 were left in circuit and it was found that the temperature rose to around 460° C.; at this elevated temperature, "cracking" of the mineral oil became evident (discoloration of the mineral oil) and also the thermal fuse or cut-out 7 blew.

It has been found that the bottom end of the temperature range should be 160° C. and the top end thereof 350° C., the optimum temperature being 325° C. or thereabouts.

Figure 4A:
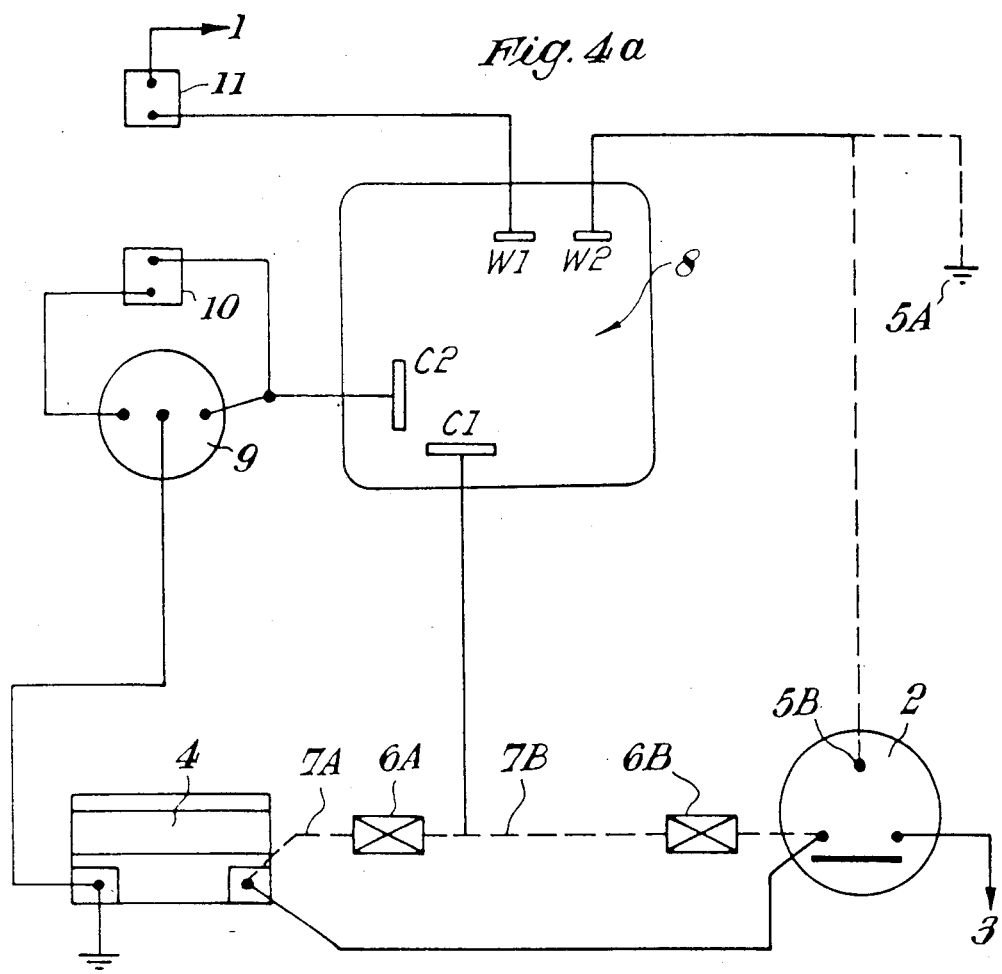

FIG. 4a is a circuit diagram illustrating a starter solenoid 2, a battery 4, fuses 6A and 6B, a relay 8, heating elements 9, a thermostat 10 and an over-temperature switch 11. The connection 1 is to the dynamo or alternator, and the connection 3 is to the starter. In the case of a dynamo, 1 is connected to main output terminal and the earth return 5A should be used; in the case of an alternator, ACR type, 1 is connected to the "Ind" terminal and the earth return 5A should be used; in the case of an alternator, six diode type, 1 is connected to the ignition supply and the earth return 5B should be used. The earth return 5A is the metal of the vehicle whereas 5B is the solenoid operating terminal. FIG. 4a includes alternative connections depending upon the position of the battery; if the battery 4 is mounted at the front of the vehicle, the circuit portion 7A is used whereas the circuit portion 7B is used if the battery is mounted at the rear of the vehicle. Moreover, because the operating relay 8 is wired across the charging system, the heating elements 9 (which are the same as the heating elements 3 in FIG. 2) are only energised when the vehicle engine 101 is running.

As to FIG. 4b, this is simply another (simplified) way of showing the electrical connections which, in turn, depend on the three different charging systems on the market. Similar parts are indicated by the same reference numerals as are used in FIG. 4a, the earth return 200A being the same as 5A, the earth return 200B being the same as 5B and the connection 201 being the same as 1.

In a spark-ignition engine, the other end of the pipework 21 could be connected at the air-intake of the carburettor, namely, upstream of the jet through which the petrol is supplied to the choke tube or venturi. It is thought that sufficiently good results could be obtained if said pipework were to be connected downstream of said choke tube. When used in connection with a spark-ignition engine having twin carburettors, the other end of the pipework 21 will be connected to each carburettor by means of a T-piece.

A shut-off valve (not illustrated) could be added to the apparatus shown in FIG. 2, for example in the pipework 11. Such shut-off valve could be electrically operated or vacuum-operated, for example, and the purpose of such valve would be to prevent the apparatus from continuing to produce mineral oil vapour(s) after the engine has been switched off. Such a shut-off valve would meet the requirements of any emission-control regulations, it is thought.

It has been found to be important to provide an air bleed (not illustrated) in the cap of the fuel tank; such an air bleed increases or improves the amount of fuel vapour drawn into the cylinders. The air bleed is necessary for compression-ignition engines and is desirable for high speed operation of any type of engine.

DESCRIPTION OF OTHER EMBODIMENTS

In FIG. 2, the tank 1 and the heat exchanger are near to one another. It will be apparent to anyone skilled in this art, however, that the tank containing the mineral oil could be placed virtually anywhere on the vehicle and that a pump (not illustrated) could be provided in order to draw said mineral oil from the tank and to deliver it to the heat exchanger. In such an arrangement, there could be a trap unit (serving exactly the same purpose as the trap section 2 in FIG. 2) adjacent the heat exchanger. The heat exchanger and the trap unit would preferably be located in the engine compartment.

Moreover, if desired, the tank 1 of FIG. 2 could be connected to the heat exchanger by way of a device similar to or identical with the device 9 disclosed in published United Kingdom Patent Specification No. 1,513,051.

The trap section 2 of FIG. 2 and the trap unit/trap section described in the two preceding paragraphs could be omitted altogether (or at least by-passed, if provided) provided that a suitable flow-regulating means is employed. In such an arrangement, the mineral oil vapour(s) could be injected directly into the intermediate element.

In the arrangement of FIG. 2, a flow-regulating means could be provided in the pipework 91 or in the pipework 21.

Brass has been mentioned as the preferred material for the tube 9 in FIG. 2. It must be pointed out, however, that other materials may well be suitable because the tubing is not exposed to the heat and corrosive effects of exhaust gases (as was the case in the arrangements disclosed in published United Kingdom Patent Specifications No. 1,513,051 and No. 2,078,297). Other materials which, it is thought, would be suitable as a substitute for brass are, for example, copper, aluminium and stainless steel.

The mineral oil may be fed (either under the influence of gravity or by a pump) by way of a filter to the heat exchanger.

FIGS. 2 and 3 illustrate tubing (for the conveyance of the mineral oil) wound in a helix around the heating elements. The converse arrangement, (namely, a straight tube for the conveyance of the mineral oil and the heating element(s) wound in a helix around said straight tube) has been tried with success and is therefore considered to be a desirable and workable alternative embodiment.

In the preferred embodiment, two heating elements 3 are used and, in the preceding paragraph, an arrangement is proposed in which two heating elements are wound in a helix about the straight tube. Of course, one heating element would (it is thought) suffice if its rating was higher and if the thermostat also had a higher setting in order to control the temperature; in such an arrangement, the thermostat would cut in and out in the manner of the thermostat or equivalent device used for example in a domestic electric iron.

It is implied, above, that the tank for the storage of the mineral oil would only be large enough to hold one liter of said oil. This would probably be large enough for many private cars but commercial and heavy goods vehicles could be equipped with larger tanks; a tank which would hold 4 liters would give about 16,000 miles (26,000 kilometers) motoring before it would become necessary to refill the tank.

Some of the advantages obtained by the use of the various embodiments of the present invention are:

1. The time taken in order to instal a system as disclosed in Specification No. 2,078,297B was about 5 to 7 hours and, because of this length of time and because of the type of work necessary, the installation had to be made at a workshop at which the customer left the vehicle for at least one complete day. A system as described in this Specification with reference to the accompanying drawings only takes 1 to 1½ hours to instal and this, together with there being no need to break into the exhaust manifold, has made is possible to provide a completely mobile service with the necessary fitting work being carried out at the office or home of the vehicle owner.

2. When a vehicle owner wishes to replace his/her existing vehicle by another one, the installed system can be easily removed, at minimal cost, from said existing vehicle and installed in the replacement one when that has been acquired. An installed system according to either of Patent Specifications No. 1,513,051 and No. 2,078,297B could not be moved so easily or without remedial work because of the work which had been done in order to insert the loop into the exhaust manifold of the engine.

3. The efficiency, in operation, of a system according to the present invention is greater than that of a system according to said Specification No. 2,078,297B because the temperature needed to vaporize the liquid mineral oil is precisely controlled (the optimum temperature being of the order of 325° C.) and because this precise control results in a constant rate of production of the required vapour.

4. The initial cost of installation of a system as described above with reference to the accompanying drawings is approximately one fifth of that of a system according to Specification No. 2,078,297B.

5. The operating relay is wired across the charging system with the result that the heating elements 3 are only energised when the engine is running. This prevents the battery from being discharged by said heating elements drawing the necessary power from the battery alone.

6. It has been known for many years (for example, from "Petroleum Refiner", 23 (7) 118 1944) that ignition accelerators can improve the performance of so-called diesel engines, and hundreds of substances have been tested for such properties; some of these substances have been found to improve the effective cetane number and ignition qualities of diesel fuels. Such "doped" diesel fuels emphasize how "pre-flame" reactions of the fuel play an important role in determining the speed of combustion thereof which, in turn, influences the performance (in particular smoothness of running) and economy of the diesel engine. Of the many substances that have been claimed to be ignition accelerators, one group of compounds is considered particularly significant in the context of the engine disclosed in said United Kingdom Patent Specification No. 1,513,051, namely, those described in United Kingdom Patent Specification No. 399,150. In the latter Patent Specification, "unsaturated hydrocarbons" were put in the fuel tank in amounts varying between 0.5 and 20% by weight of the total fuel. The proportion of ignition accelerator so added produced an effect dependent on the nature of the bulk fuel, but the general claim was made that every oil suitable as a fuel for diesel engines may be improved by adding strongly unsaturated fluid hydrocarbons containing more than two carbon atoms. Although the ignition accelerators so far considered were added directly to the fuel, it is reasonable to assume that a similar effect is now being achieved by introducing them into the fuel-air mixture being supplied to the diesel engine if their physical and chemical properties were suitable. The requirements for such a mode of introduction to the combustion chambers of the engine should be set against the time-pressure diagram of the compression and expansion strokes in a diesel engine, said diagram being shown in "Combustion, Flames and Explosions of Gases" by Lewis and von Elbe, New York, 1951 page 728. The olefins and gases produced by the arrangement(s) described in this Specification with reference to the accompanying drawings are compressed with the air in the compression stroke of the engine, culminating in the period of ignition lag (phase 1), and "ignite" at a temperature (around 600 C.) normally encountered at the end of the compression stroke; the fuel is then injected into a "flame nucleated" combustion chamber so reducing the crucial period between the beginning of injection and ignition. It is important to note that, in ideal compression-ignition combustion, every particle of fuel burns immediately and completely, and the time-pressure sequence would follow curve 1 of the diagram from Lewis and von Elbe. The importance of the present invention if one is to believe recent press reports which suggest that changes envisaged in refinery procedues will result in diesel fuels of lower cetane number; such fuels will (in the absence of any improvements like those provided by the present invention) make existing engines run more roughly, produce more noise and more smoke and will further reduce miles per gallon.

What is claimed is:

1. A multi-cylinder internal combustion engine which comprises, in combination:
   (a) means for conducting a fluid including air to each of said engine cylinders;
   (b) an electrically heated heat exchanger;
   (c) a main fuel tank for the storage and carriage of the fuel which is burnt in said cylinders in order to produce heat which is converted into mechanical power;
   (d) an auxiliary tank for the storage and carriage of a liquid mineral oil;
   (e) a trap section in said auxiliary tank, said trap section consisting of part of the volume of the auxiliary tank above the maximum permitted level of mineral oil to be stored therein;
   (f) a tube which forms part of said heat exchanger, said tube having inlet and outlet ends of which the inlet end is connected to the bottom of said auxiliary tank and of which the outlet end is connected to said trap section; and
   (g) an intermediate means connected both to said engine cylinders and to said trap section for conducting vaporised mineral oil from said trap section to said engine cylinder;
   whereby mineral oil which passes into said heat exchanger is substantially completely vaporised therein, the vaporised mineral oil thereafter passing through the trap section and through the intermediate means to said engine cylinders for burning with the fuel/air mixture.

2. A multi-cylinder internal combustion engine which comprises, in combination:
   (a) means for conducting a fluid including air to each of said engine cylinders;
   (b) an electrically heated heat exchanger;
   (c) a main fuel tank for the storage and carriage of the fuel which is burnt in said cylinders in order to produce heat which is converted into mechanical power;
   (d) an auxiliary tank for the storage and carriage of a liquid mineral oil;
   (e) a trap downstream of said heat exchanger;
   (f) a tube which forms part of said heat exchanger, said tube having inlet and outlet ends of which the inlet end is connected to said auxiliary tank and of which the outlet end is connected to said trap; and
   (g) an intermediate means connected both to said engine cylinders and to said trap for conducting vaporised mineral oil from said trap to said engine cylinders;

whereby mineral oil which passes into said heat exchanger is substantially completely vaporised therein, the vaporised mineral oil thereafter passing firstly through the trap in which any large mineral oil droplets fall out of the vapor and secondly through the intermediate means to said engine cylinders for burning with the fuel/air mixture.

3. A multi-cylinder internal combustion engine which comprises, in combination,
   (a) means for conducting a fluid including air to each of said engine cylinders;
   (b) an electrically heated heat exchanger;
   (c) a main fuel tank for the storage and carriage of the fuel which is burnt in said cylinders in order to produce heat which is converted into mechanical power;
   (d) an auxiliary tank for the storage and carriage of a liquid mineral oil;
   (e) a tube which forms part of said heat exchanger, said tube having inlet and outlet ends;
   (f) an intermediate means for conducting vaporised mineral oil from said heat exchanger to said engine cylinders;
   (g) said inlet end of said tube being connected to the bottom of said auxiliary tank and said outlet end of said tube being directly connected to said intermediate means; and
   (h) said intermediate means being connnected to each of the cylinders of the engine;
   whereby mineral oil passes into said heat exchanger and is substantially completely vaporised therein, then vaporised mineral oil thereafter passing through the intermediate means to said engine cylinders wherein it is burnt with the fuel/air mixture.

4. A multi-cylinder internal combustion engine which comprises first means for conducting a combustible charge of fuel and air to each cylinder of the engine, and second means including an electrically heated heat exchanger in which at least a part of a quantity of liquid mineral oil is converted from its liquid condition to a vapor which is added to said combustible charge, whereby the efficiency of the engine is improved, said engine further includes an intermediate means which is located downstream of said heat exchanger and which is connected both to said heat exchanger and to each cylinder of the engine.

5. An engine as claimed in claim 4, wherein the engine is a spark-ignition engine and wherein the intermediate means is a carburetor.

6. An engine as claimed in claim 4, wherein the engine is a compression-ignition engine and wherein the intermediate means is an air-intake device.

7. An engine as claimed in claim 4, wherein said heat exchanger comprises at least one electrical heating element and an elongate hollow member, said heating element when energised generating heat which is absorbed by said elongate hollow member into one end of which said liquid mineral oil flows.

8. An engine as claimed in claim 7, wherein the elongate hollow member is a tube, said tube being wound in a helix and wherein said at least one electrical heating element is positioned within at least some of the convolutions of the helically wound tube.

9. An engine as claimed in claim 7, wherein the elongate hollow member is a tube, said tube being straight and wherein said at least one electrical heating element is wound in a helix whose convolutions extend around at least a part of the length of said straight tube.

* * * * *